US011336667B2

(12) United States Patent
George et al.

(10) Patent No.: US 11,336,667 B2
(45) Date of Patent: May 17, 2022

(54) SINGLE POINT SECURED MECHANISM TO DISABLE AND ENABLE THE ACCESS TO ALL USER ASSOCIATED ENTITIES

(71) Applicant: Avaya Inc., Santa Clara, CA (US)

(72) Inventors: Jibin George, Manjri Pune (IN); Salil Dhawan, Magarpatta (IN); Sandeep Goynar, Pune (IN); Harsimran Jeet Singh, Pune (IN)

(73) Assignee: Avaya Inc., Santa Clara, CA (US)

( * ) Notice: Subject to any disclaimer, the term of this patent is extended or adjusted under 35 U.S.C. 154(b) by 438 days.

(21) Appl. No.: 16/242,180

(22) Filed: Jan. 8, 2019

(65) Prior Publication Data

US 2020/0220886 A1  Jul. 9, 2020

(51) Int. Cl.
*H04L 29/06* (2006.01)
(52) U.S. Cl.
CPC ........ *H04L 63/1425* (2013.01); *H04L 63/102* (2013.01); *H04L 63/12* (2013.01); *H04L 63/20* (2013.01)
(58) Field of Classification Search
CPC ... H04L 63/102; H04L 63/12; H04L 63/1425; H04L 63/20; H04L 63/0236; H04L 63/1441; H04W 12/088; H04W 12/126; H04W 12/72; G06F 21/577
See application file for complete search history.

(56) References Cited

U.S. PATENT DOCUMENTS

2019/0349351 A1\* 11/2019 Verma .................. G06F 21/552

\* cited by examiner

*Primary Examiner* — Olugbenga O Idowu
(74) *Attorney, Agent, or Firm* — Sheridan Ross P.C.

(57) ABSTRACT

Users often have multiple resource (e.g., devices, accounts, authorizations, permissions, etc.) that utilize or leverage a credential that may become compromised. A stolen mobile device may allow unauthorized access to the device to make and receive calls and potentially expose other resources (e.g., emails, text messages, accounts, etc.). Maintaining all these accounts is cumbersome and error prone. Having a ledger indicating resources that are blocked is provided. Copies of the ledger are maintained by other entities and updates exchanged therebetween. As a result, parties can be quickly notified when a resource should be blocked, or unblocked, if blocking is no longer warranted.

20 Claims, 5 Drawing Sheets

| Resource identifier (208) | Functional (406) | Credential (408) | Blocked (210) |
|---|---|---|---|
| Resource identifier A | Functional Attribute 1 | Credential 1 | Blocked (Y/N) |
| Resource identifier A | Functional Attribute 1 | Credential 2 | Blocked (Y/N) |
| Resource identifier A | Functional Attribute 2 | Credential 1 | Blocked (Y/N) |
| Resource identifier A | Functional Attribute 3 | Credential 3 | Blocked (Y/N) |
| Resource identifier B | Functional Attribute 1 | Credential 1 | Blocked (Y/N) |

402A, 402B, 402C, 402D, 402E

SINGLE POINT SECURED MECHANISM TO DISABLE AND ENABLE THE ACCESS TO ALL USER ASSOCIATED ENTITIES

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for automatic message generation and particularly to security event message generation and processing.

BACKGROUND

For many devices and their users, there is an increased dependence on the usage of only a handful of logins to access a variety of resources, such as websites, applications, other devices, etc. While utilizing one login (e.g., single sign-on) or having a common access credential (e.g., username and password) for more than one restricted resource improves usability by allowing the user to rely on a fewer number of logins to remember or utilize. However, once one login or credential is compromised, other restricted resources are at a greater risk of being compromised. For example, a mobile device may become compromised or an email account gets hacked and, as a result, login information may be accessed that allows a nefarious user to access other controlled resources, such as a banking application. Once a login has been, or is suspected of being, compromised, the user a service provider may take steps to limit access, such as disabling access for an otherwise legitimate login. The process then has to be repeated for each operator of a restricted resource, assuming the user remembers each restricted resource and can contact the appropriate party to block access.

If a blocked resource should be unblocked, such as due to a false alarm (e.g., a "stolen" mobile device was just mislaid), requesting new login credentials, or other determination that blocking the resource is not warranted, the user may have to content the provider of the particular resource to obtain access and/or new authorization credentials—often a cumbersome and time-intensive task.

SUMMARY

These and other needs are addressed by the various embodiments and configurations of the present invention. The present invention can provide a number of advantages depending on the particular configuration. These and other advantages will be apparent from the disclosure of the invention(s) contained herein.

A single point of contact and associated mechanism, wherein user can ask to disable and enable access to all associated resources, would alleviate the majority of the time, frustration, and errors associated contacting each resource provider individually. At present, a user has to manually contact individual entities which takes time, time that may allow a nefarious actor to access other resources. By providing a single seamless solution to the user that allows for all resources to be blocked and unblocked improves both security and convenience. As described more completely herein, a user-initiated action allows all the stakeholders to be notified of a block (or unblock) request in a minimal amount of time.

In one embodiment, customers (individual/organization) have their own ledger. The customer can add each of the contact centers, as ledger network peers, with which he/she has accounts. The ledger is constructed for the customer identifying the peers that will be the contact center entities associated with each resource (e.g., account, devices, etc.).

When a fraud occurs through any of the accounts in the ledger the other peers get a notification. Data is put inside the ledger with the details of the fraud and the affected identities of the customer like mobile number or email. For example, a bank can detect a fraud has occurred affecting a customer's account or the customer him or herself may discover the fraud has occurred, such as upon getting a transaction notification from the bank. Detection of fraud by banks can happen through prior-art methods like data analytics tools. If a bank detects the fraud or, at least suspicious activity, the bank can put the details inside the ledger and the customer will be prompted to confirm the fraud and/or approve the response (e.g., blocking additional transactions, notifying other entities, etc.). If it is the customer that detects the fraud, he/she can put the details inside the ledger and bank can be then be the approver, such as after verifying the transaction details. Here the individual customer or enterprise either has provide the data, such as comprising details of the fraud, or the approver of the response, such as a "soft" or partial block or a "hard" or complete block of all the user's accounts/devices. Preferably, control of the data in the ledger resides with the customer. In one embodiment, additional approvers are required to reach consensus that a fraud has occurred and a block should be initiated. For example, a chain of parties involved in a transaction, when may further include payment gateways, can be approvers by assessing the transaction. Once entry of fraud data into the ledger is approved, by each required approver, and the consensus is built, the list of approvers, the consensus, and/or other data is then copied to each version of the ledger and each of the contact centers in the ledger is notified.

Depending on functionality, each of the contact centers will soft block or hard block the access to the affected entity. For example, a customer's mobile number may have been the used in the original or, at least, a prior fraudulent transaction. The mobile carrier may then block the data subscriber identification module (SIM) card number associated with the mobile number. This ensures the no one, including the nefarious actor, would be able to make calls or send or receive data, such as reporting a forgotten password to another entity in the hopes of getting a one-time password (OTP) or other information to further the fraud.

Other entities who use the mobile number, (e.g., as a user ID, verification contact, etc.) can utilized their own password to block access to that particular account. As a result additional fraudulent transactions may be avoided.

Once the customer again secures the identity data then the customer can insert new data in the ledger with the status as 'unblock' and the entity which was used to re-secure the data can be the approver. Here for example, an email account was compromised. Then the customer changes the password of the email and it is verified that customer himself has changed the password through another channel like an OTP to his mobile number by the email service provider. Accordingly, the email service provider may be the approver for the entity.

Once there is a consensus that entities are secured again contact center entities can re-enable the accounts.

The platform itself should be highly secured so that it should not be vulnerable to attacks and attackers putting 'block' or 'unblock' instructions and thereby making accounts inaccessible to the customer. For making it highly secure and only authorized parties can insert blocks, the solution uses distributed ledgers.

In one embodiment, a networked device is disclosed, comprising: a microprocessor; a network interface; a data storage; the microprocessor, receiving indicia of a suspicious action associated with a first resource; in response to receiving the indicia of the suspicious action, accessing a first ledger in the data storage, the first ledger comprising indicia of a second resource and a contact associated with the second resource; generating a message addressed to the contact to cause the contact, upon receiving the message, to block utilization of the second resource; and sending, via the network interface, the message to the contact.

In another embodiment, a method, comprising: receiving indicia of a suspicious action associated with a first resource; in response to receiving the indicia of the suspicious action, accessing a first ledger in a data storage, the first ledger comprising indicia of a second resource and a contact associated with the second resource; generating a message addressed to the contact to cause the contact, upon receiving the message, to block utilization of the second resource; and sending, via the network interface, the message to the contact.

In another embodiment, a network, comprising: a plurality of nodes on a communication network, each node comprising at least a microprocessor, a data storage, and a communication interface to facilitate communications between the microprocessor and any one or more other nodes of the plurality of nodes, each node of the plurality of nodes selectively providing at least one resource to a user; conditionally allowing the user, utilizing a first node, to utilize resources provided by each node of the plurality of nodes, the condition comprising determining whether the resources are not blocked as determined by an entry in a ledger maintained by each of the plurality of nodes; receiving, at a first node of the plurality of nodes, indicia of a suspicious action associated with a first resource; in response to receiving the indicia of the suspicious action, the first node performs (a) updating a first ledger associated with the first node, comprising updating entries for one or more resources provided by the first node as blocked and (b) signals all other nodes of the plurality of nodes to update their respective ledgers, comprising updating entries for one or more resources provided by ones of the other nodes as blocked; and upon receiving, at a receiving node of the plurality of nodes, a request from any source on the network for a resource, denying the request upon determining the requested resource is associated with an entry in the ledger associated with the receiving node indicating the resource is blocked.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "mneans" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
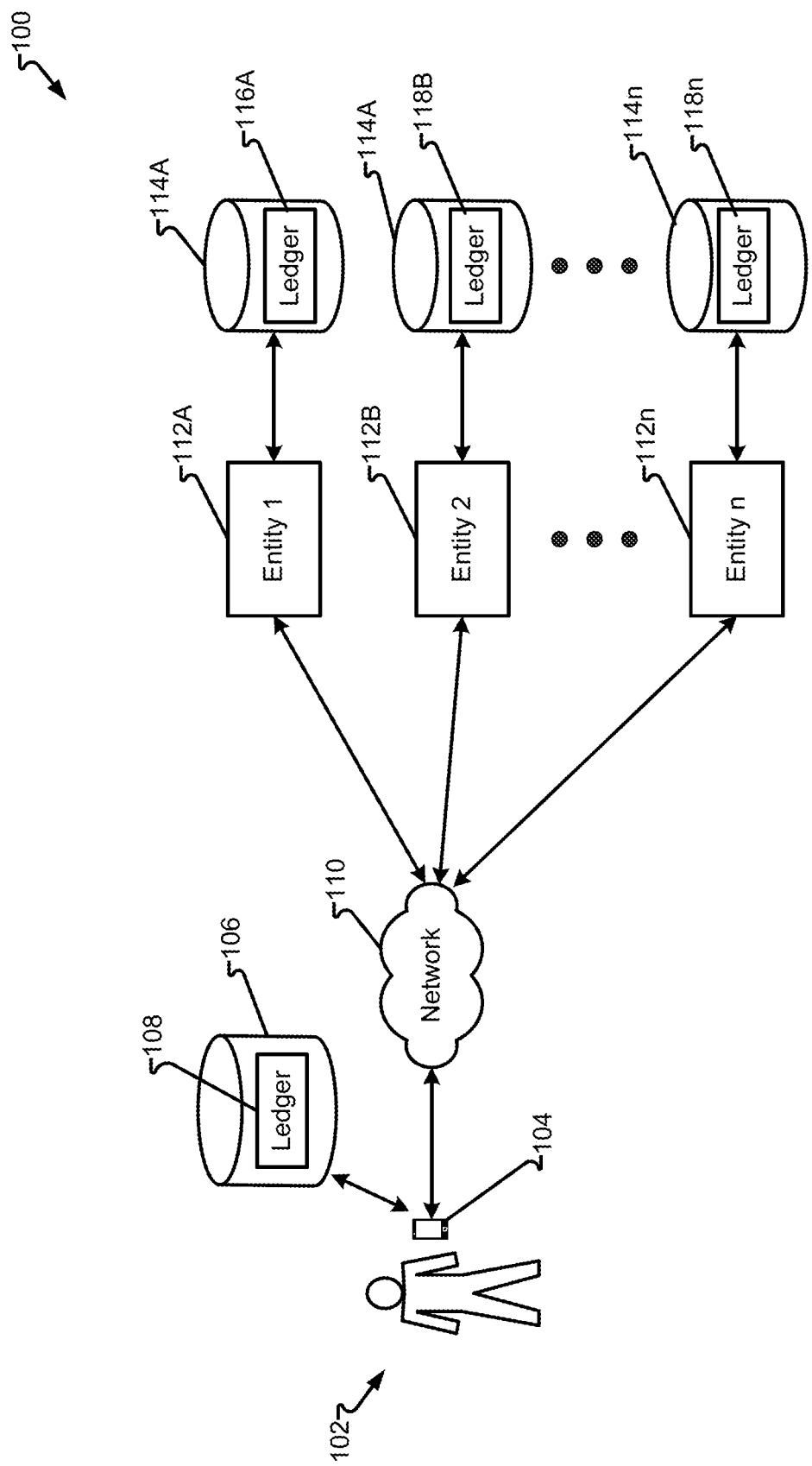
FIG. 1 depicts a first system in accordance with embodiments of the present disclosure.

FIG. 1 depicts system 100 in accordance with embodiments of the present disclosure. In one embodiment, user 102 utilizes user device 104 having data storage 106 which, in turn, contains ledger 108. In other embodiments, data storage 106 and, accordingly, so to may ledger 108, such as externally to user device 104, such as on a removable memory, media device, remote storage (e.g., "cloud"), docked component, etc. User device 104 may utilize network 110 to communicate with entity 112, which may be one or more enterprises, contact centers, companies, financial institutions, service providers, government agencies, schools or universities, third-parties, etc. Each of entity 112 having be previously entrusted to maintain a copy of ledger 116 within their own respective data storage 114. Each device (e.g., user device 104, entity(s) 112) may then each be a node on network comprising network 110 and/or other network, for the purpose of exchanging electronic communications therebetween.

It should be appreciated that ledger 108 and each of ledger 116 are protected with appropriate safeguards to avoid, and hopefully prevent, unauthorized access. For example, passwords, encryption, two-part authentication, and/or other means may be utilized to ensure only the authorized parties obtain access.

In another embodiment, all copies of the ledger (e.g., ledger 108, ledger 116A, ledger 116B-ledger 116n) are synchronized automatically and without human action. As a result, a chance on one is, absent a non-consequential delay, is a change to all. In another embodiment, an entity does (or is only permitted to) affect records in the ledger that are determined by that particular entity. For example, entity 1 (112A) does not (or cannot) affect an entry in any ledger, including ledger 116A, that is associated with entity 2 (112B) and vice versa. However, that same entry, that is the one associated with entity 1 (112A) in ledger 116A, is also determined for ledger 116B.

In another embodiment, the content of the ledgers (e.g., ledger 108, ledger 116A-ledger 116n) comprises records associated with resources and whether access to the resource should or should not be granted. User 102, who misplaces or has user device 104 stolen, may cause ledger 108 to be updated. When ledger 108 is physically maintained on user device 104, user 102 may have to access a different ledger, such as by contacting one or more entity 112 and notifying them that user device 104 may be, or has been, compromised. In one embodiment, all records in the ledger are modified to block access to their associated resource. In another embodiment, only those records associated with compromised credentials associated with the, now absent, user device 104 are blocked. For example, entity 1 (112A) may be a cellular telephone provider and gate the resources authorized for user device 104, when embodied as a mobile device. For example, making and receiving calls, data transmission, etc., may be limited. However, entity 2 (112B) may be a bank and the resource (e.g., bank account) associated with user 102 requires the use of a bank card, which user 102 still has. Accordingly, while entity 1 (112A) may seek to block all resources, entity 2 (112B) may block no resources. In yet another embodiment, entity 1 (112A), such as when embodied as a cellular phone service provider, may seek to block normal access to a resource. For example, calls may be sent to emergency services or the customer service number of entity 1 (112A). Similarly, normal data resource access may be entirely blocked, but in another embodiment, an attempt to utilize data transmission, such as to access a website, may route all such requested websites to another location, such as a customer service webpage for entity 1 (112A).

In another embodiment, the resource blocked by a ledger, such as ledger 108, is on user device 104 itself. Access to a resource (e.g., emails, contacts, cellular phone functionality, data transmission functionality, photographs, stored passwords, etc.), may be blocked by either a single, master, entry in ledger 108 or a collection of individual entries in ledger 108. As a result user device 104 may be "bricked" and be inoperable for all purposes or for one or more specific purposes (e.g., permit only calls to a customer service number and to emergency services).

Figure 2:
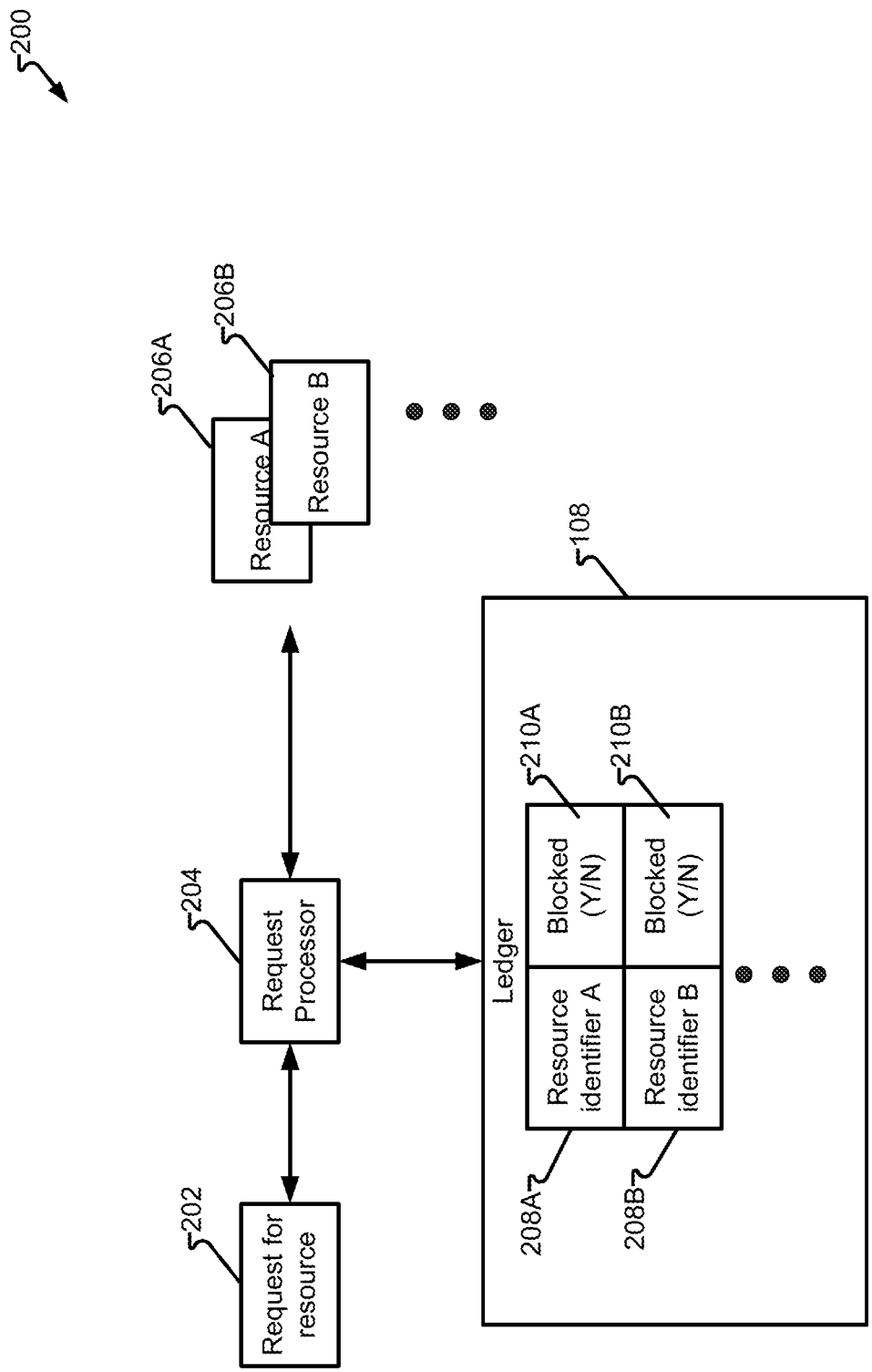
FIG. 2 depicts a second system in accordance with embodiments of the present disclosure.

FIG. 2 depicts system 200 in accordance with embodiments of the present disclosure. Once a determination has been made to block one or more resources, the blocking occurs without human intervention or action. An update to one ledger is automatically propagated to the contacts therein (or associated therewith) without human action. Resources, or components that provide access to the resource, are configured to check their respective ledger to determine if a request for a resource should be granted or denied and/or access to the resource is prevented or allowed. In one embodiment, request for resource 202 is received by request processor 204. Request processor 204 may be a general-purpose microprocessor, purpose-built microprocessor (e.g., ASIC), or other form of single or multiple process component having, or having access to, a network interface, such as to network 110 and/or other networks (e.g., bus, cellular, WiFi, LAN, WAN, peer-to-peer, etc.) to communicate with the source of the request for resource 202 and/or resource 206, such as one or more of resource 206A, resource 206B, etc.

One embodiment of ledger 108 is depicted in system 200. One record comprises resource indicia A 208A and status 210A, another record comprises resource indicia B 208B and status 210B, additional records may also be provided as indicated by the ellipses. Additionally or alternatively, other entries for one or more or each record of ledger 108 may be provided (e.g., human readable name, encryption key, etc.). For example, request for resource 202 is received at request processor 204, such as for resource 206B. Request processor 204 then, in accordance with the current value of status 210B, grants or denies the request. In another embodiment, request for resource 202 may be, or appear to be, any user (human or client application) on any device, as one who misappropriated an account credential or a device may appear to be a legitimate user. However, request processor 204 considers the value of status 210B as authoritative.

It should be appreciated that other means and motivations may exist to block access to a resource in addition to the ones provided herein. For example, request for resource 202 may request resource 206A and status 210A, associated with resource indicia A 208A, is not blocked. However, if resource 206A is a resource that is no longer authorized for other reasons (e.g., failure to pay a fee, returned product associated with the resource, closed account, etc.) then request processor 204 and/or other component may deny access even though the associated value of status 210A may not be blocked.

Figure 3:
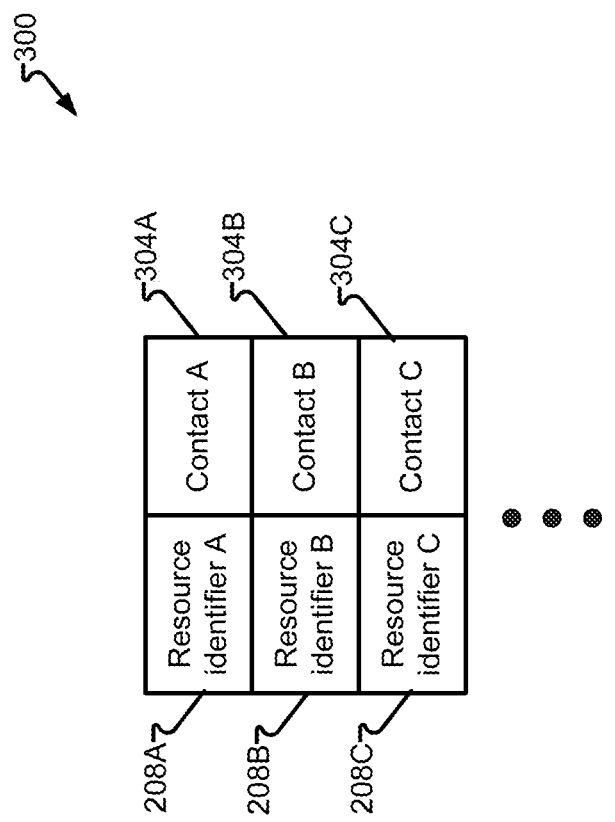
FIG. 3 depicts a first ledger in accordance with embodiments of the present disclosure.

FIG. 3 depicts ledger 300 in accordance with embodiments of the present disclosure. Ledger 300 illustrates supplemental entries, such as to supplement the records of ledger 108 with contact information. It should be appreciated that any ledger (e.g., ledger 108, ledger 300, ledger 400, etc.) may comprise any form of database including records having entries stored in any one or more databases, files, remote locations, etc.

In one embodiment ledger 300 comprises contact 304 (e.g., contact 304A, contact 304B, contact 304C, etc.) are each associated with a corresponding resource indicia 208 (e.g., resource indicia A 208A, resource indicia B 208B, resource indicia 208C, etc.). Upon the occurrence of a suspicious or known fraudulent act, contacts 304 are notified so as to update their respective ledgers. Contacts 304 may comprise email addresses, phone numbers to receive automated messages, text message addresses, website login, etc. The messages provided may be verbose, such as to describe the user, the type of activity, etc. or more succinct, such as to just provide a replacement ledger 300, such as for a particular user, or indicia of a particular record to update. Entries in the records of ledger 300 may also be encrypted themselves and/or comprise security information (e.g., encryption keys, passwords, two-party authentication procedures, etc.) so that a receiving party can have assurances that any update requests received are legitimate.

In another embodiment, user 102 and/or the entity 112 may have determined that a compromised, or potentially compromised, resource or credential was blocked, but was blocked in error or it has become apparent that blocking is no longer warranted. For example, user 102 may have thought user device 104 was lost, stolen, or otherwise had the potential to be used by an unauthorized party and/or nefarious actor. However, if user 102 later finds user device 104 was merely mislaid and had no opportunity to be compromised, all resources block should then be unblocked. Accordingly, user 102 may cause data storage 106 to unblock all records and notify all parties in contact 304 of the update to ledger 300.

Figure 4:
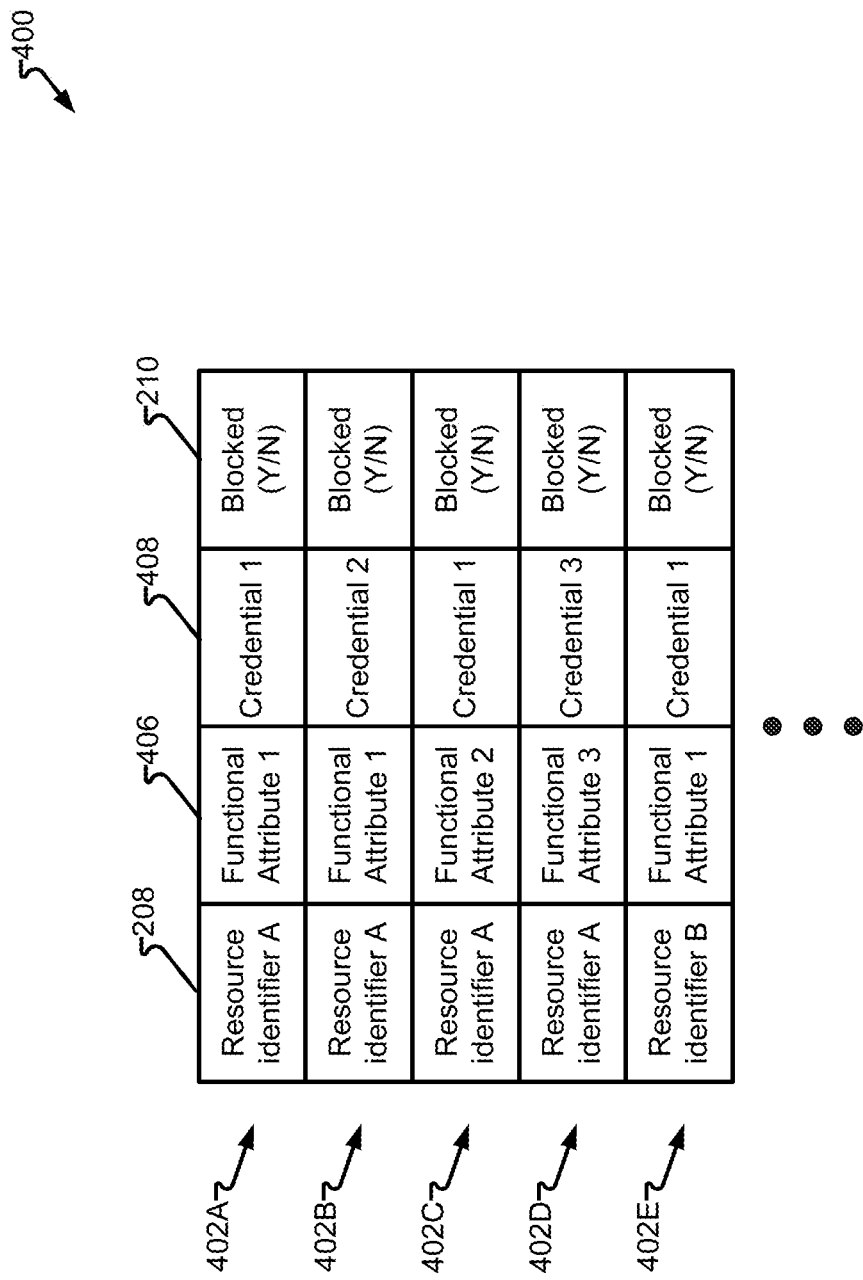
FIG. 4 depicts a second ledger in accordance with embodiments of the present disclosure.

FIG. 4 depicts ledger 400 in accordance with embodiments of the present disclosure. In one embodiment, ledger 400 comprises records 402, each record having resource indicia 208, functional attribute 406, credential 408, status 210. In another embodiment, other record elements may be included, such as those illustrated and described with respect to ledger 108, ledger 300, and/or other record elements.

In one embodiment, record 402 comprise functional attribute 406, such as to indicate a resource, type of resource, and/or type of access to the resource that is to be denied. For example, functional attribute 406 associated with record 402A may indicate one or more attributes for a device. The device may have functional attributes such as read, write, change settings, reset/restart, etc. Record 402A may be specifically related to the "read" operation, such that a corresponding status 210 of "block" disables the "read" functionality. Additional record 402 may address other functional attribute 406 values. Therefore, a device, such a storage device, processing device, security device, communication device, may be blocked with respect to certain functions but not necessarily all functions, as may be appropriate for a give level of risk and/or potential harm that a nefarious actor may do.

In another example, record 402B has resource indicia 208 associated with a financial account. A particular functional attribute 406 value may be "withdrawal funds" and be blocked by a corresponding value of the associated status 210 to indicate "blocked." However, it may be an acceptable risk to allow other parties to deposit funds into the account and, therefore, a different record 402 may indicate that "deposit" as a different functional attribute 406 and, when determined to be appropriate, have a status 210 associated with "unblocked." It should be appreciated that other functional attributes 406 may be utilized for the particular resource being protected.

In another embodiment, credential 408 identifies the credential utilized to access the associated resource in resource indicia 208. Blocking all resources associated with a particular user or users may be unnecessarily restrictive. For example, a value of credential 408 (e.g., "credential 1") may indicate that SIM card #12345 has been, or may be, compromised. Accordingly, resources that may be accessed by a party with the SIM card, such as the particular resource in resource indicia 208 of record 402C, record 402E, etc. is at risk and, if not already, should have a value of their respective status 210 indicating "blocked." However, record 402B having a value of credential 408 (e.g., "credential 2") is a different credential (e.g., password, voiceprint signature, personal identification number, private key, etc.) or other credential that is known to be unobtainable, even by a party having access to the SIM card. Accordingly, other credentials may remain active and their associated resource remain unblocked, such as for record 402B, record 402D, and other values of credential 408 different from the compromised value of credential 408.

Figure 5:
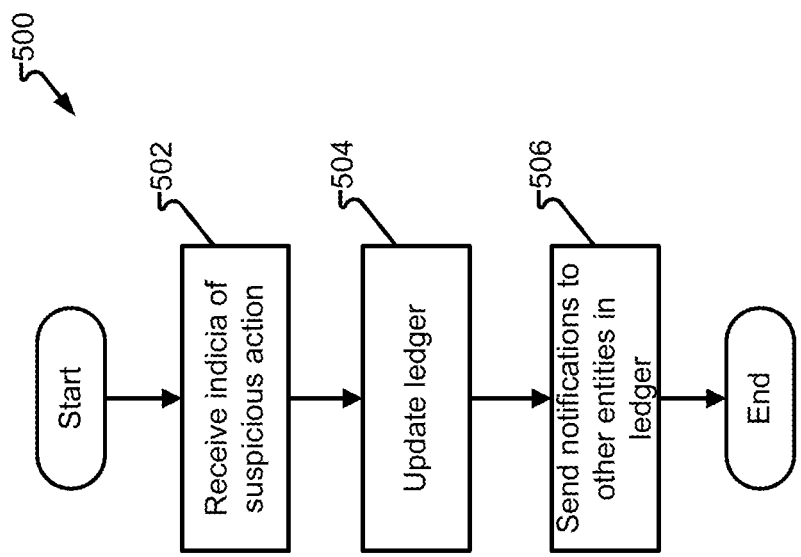
FIG. 5 depicts a process in accordance with embodiments of the present disclosure.

FIG. 5 depicts process 500 in accordance with embodiments of the present disclosure. In one embodiment, a microprocessor of a device (e.g., user device 104, component of entity 112, etc.) receives indicia of a suspicious action in step 502. The action may be receiving an updated ledger from another peer party (e.g., an entity having an entry in the receiving party's ledger) indicating an update to the ledger whereby at least one resource is to be blocked. In another embodiment, the suspicious activity may be an input from a user, such as user 102, upon determining an action was not authorized or legitimate. In another embodiment, automated resources may monitor resources or other devices, accounts, transactions, etc. to determine if an unauthorized activity has or is likely to have occurred. An automated system may have a database or other repository of actions that, alone or in combination, are associated with fraudulent activities. For example, entity 112A may be a bank and see that a number of customer accounts are being charged for purchases from a particular source, the source may even be used by some of the account holders and, on other occasions, not be associated with fraudulent use. However, the bank's automated system determines the activity is likely fraudulent and reports it in step 502 to the appropriate components.

Step 504 updates the ledger, such as to block all resources, block certain resources, and/or block resources that are accessed by a particular credential, a credential that may be associated with the particular action of step 502. Next, step 506 sends a notification to other parties (e.g., contacts in contact 304) to update their respective ledgers to indicate the blocked resources.

Additionally or alternatively, step 502 may be re-executed upon receiving indicia indicating no suspicious action is, or has, occurred. Accordingly, the device having the particular ledger may be updated in step 504 to clear the "block" indicia and, in step 506, the update propagated to the other entities. As a further addition or alternative, entities (e.g., entity(s) 112 and/or user 102 using user device 104) may vote, veto, or otherwise obtain at least one other party to agree to the unblocking (or blocking) of a particular resource. For example, a record may indicate a party requesting a change (block to unblock or vice versa) and another party may agree or disagree. A rule may further state the criteria to perform the action (e.g., no dissenting vote, at least one supporting vote, a majority decision, etc.). Certain parties may have veto authority. For example, a number of parties may agree that an email account has be re-secured with a new password, however, if the email provider (one of entities 112) disagrees, they may have information no available to the other authorities and be able to cast a vetoing decision. Such rules may be maintain in separate data structures and/or integrated in the data storage devices (e.g., ledger 108, data storage 114, etc.) and/or within their respective ledgers (e.g., ledger 108, ledger 116, etc.).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose microprocessor (e.g., GPU, CPU), or logic circuits programmed with the instructions to perform the methods (e.g., FPGA). In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A networked device, comprising:
a microprocessor;
a network interface;
a data storage;
the microprocessor,
receiving indicia of a suspicious action associated with a first resource, wherein the first resource requires a resource credential for access thereto;
in response to receiving the indicia of the suspicious action, accessing a first ledger in the data storage, the first ledger comprising indicia of a second resource and a contact associated with the second resource, wherein the first resource requires the resource credential for access thereto;
generating a message addressed to the contact to cause the contact, upon receiving the message, to block utilization of the second resource; and
sending, via the network interface, the message to the contact.

2. The networked device of claim 1, wherein the microprocessor, upon receiving the indicia of the suspicious action, updates the first ledger to indicate the first resource is blocked.

3. The networked device of claim 1, wherein the second resource, when blocked, has at least one functional attribute of the second resource disabled.

4. The networked device of claim 3, wherein the at least one functional attribute of the second resource that is disabled, when blocked, comprising denying use of the second resource to perform one or more of a user-requested transaction, authenticate an entity, operate in an unconstrained mode, receive sensitive information, provide sensitive information, or enable user-requested communications.

5. The networked device of claim 1, wherein requests to utilize at least one of the first resource or the second resource is denied to any requesting party while a ledger entry associated with the first resource indicates the first resource is blocked.

6. The networked device of claim 1, wherein:
the first ledger further comprises indicia of each of a plurality of resources, comprising at least the first resource and second resource, each of the plurality of resources being associated with ones of a corresponding plurality of contacts;
generating a plurality of messages, comprising at least the message, to cause the corresponding plurality of contacts to each block their associated ones of the plurality of resources; and
sending, via the network interface, the plurality of messages.

7. The networked device of claim 6, further comprising the microprocessor, upon receiving indicia of an unblock action, the microprocessor:
receives indicia of an unblock action associated with the first resource;
in response to receiving the indicia of the unblock action, accesses the first ledger comprising indicia of the second resource and the contact associated with the second resource;
generates an unblock message addressed to the contact to cause the contact, upon receiving the unblock message, to unblock utilization of the second resource; and
sends, via the network interface, the unblock message to the contact.

8. The networked device of claim 7, wherein:
the first ledger further comprises indicia of the plurality of resources each of the plurality of resources being associated with ones of a corresponding plurality of contacts;
generating a plurality of unblock messages, comprising at least the unblock message, to cause the corresponding plurality of contacts to unblock their associated ones of the plurality of resources; and sending, via the network interface, the plurality of unblock messages.

9. The networked device of claim 1, wherein the microprocessor receives the indicia of the suspicious action upon the microprocessor determining that the device has at least attempted to perform an action associated with an entry in a fraudulent activity database.

10. The networked device of claim 1, wherein the microprocessor, upon receiving an edit to the first ledger, sends the edit to the contact.

11. A method, comprising:
receiving indicia of a suspicious action associated with a first resource, wherein the first resource requires a resource credential for access thereto;
in response to receiving the indicia of the suspicious action, accessing a first ledger in a data storage, the first ledger comprising indicia of a second resource and a contact associated with the second resource, wherein the second resources requires the resource credential for access thereto;
generating a message addressed to the contact to cause the contact, upon receiving the message, to block utilization of the second resource; and
sending, via a network interface, the message to the contact.

12. The method of claim 11, further comprising, upon receiving the indicia of the suspicious action, updating the first ledger to indicate the first resource is blocked.

13. The method of claim 11, wherein the second resource, when blocked, has at least one functional attribute of the second resource disabled.

14. The method of claim 13, wherein the at least one functional attribute of the second resource that is disabled when blocked, comprises denying use of the second resource to perform one or more of a user-requested transaction, authenticate an entity, operate in an unconstrained mode, receive sensitive information, provide sensitive information, or enable user-requested communications.

15. The method of claim 11, wherein requests to utilize at least one of the first resource or the second resource is denied to any requesting party while a ledger entry associated with the first resource indicates the first resource is blocked.

16. The method of claim 11, further comprising:
wherein the first ledger further comprises indicia of a plurality of resources each of the plurality of resources being associated with ones of a corresponding plurality of contacts; and
generating a plurality of messages, comprising at least the message, to cause the corresponding plurality of contacts to block their associated ones of the plurality of resources; and
sending, via the network interface, the plurality of messages.

17. The method of claim 16, further comprising:
receiving indicia of an unblock action associated with the first resource;
in response to receiving the indicia of the unblock action, accesses the first ledger in the data storage, the first ledger comprising indicia of the second resource and the contact associated with the second resource;
generating an unblock message addressed to the contact to cause the contact, upon receiving the unblock message, to unblock utilization of the second resource; and
sending the unblock message to the contact.

18. The method of claim 11, wherein receiving the indicia of the suspicious action comprises determining that a system has at least attempted to perform an action associated with an entry in a fraudulent usage database available to a microprocessor.

19. A network, comprising:
a plurality of nodes on a communication network, each node comprising at least a microprocessor, a data storage, and a communication interface to facilitate communications between the microprocessor and any one or more other nodes of the plurality of nodes, each node of the plurality of nodes selectively providing at least one resource to a user, wherein each of the at least one resource requires a credential for access thereto;
conditionally allowing the user, utilizing a first node, to utilize resources provided by each node of the plurality of nodes, the conditionally allowing comprising determining whether the resources are not blocked as determined by an entry in a ledger maintained by each of the plurality of nodes;
receiving, at a first node of the plurality of nodes, indicia of a suspicious action associated with a first resource, wherein the first resource requires the credential for access thereto;
in response to receiving the indicia of the suspicious action, the first node performs (a) updating a first ledger associated with the first node, comprising updating entries for one or more resources provided by the first node as blocked and (b) signals all other nodes of the plurality of nodes to update their respective ledgers, comprising updating entries for one or more resources provided by ones of the other nodes as blocked; and
upon receiving, at a receiving node of the plurality of nodes, a request from any source on the network for a resource, denying the request upon determining that the requested resource is associated with an entry in the ledger associated with the receiving node indicating the resource is blocked.

20. The network of claim 19, wherein upon receiving, at the receiving node of the plurality of nodes, the request from any source on the network for the resource, granting the request upon determining the requested resource is associated with the entry in the ledger associated with the receiving node indicating that the requested resource is not blocked.

* * * * *